*(12)* United States Patent
Pramod et al.

*(10)* Patent No.: US 10,340,828 B2
*(45)* Date of Patent: Jul. 2, 2019

*(54)* DISTURBANCE OBSERVER FOR PERMANENT MAGNET DIRECT CURRENT MACHINES

*(71)* Applicant: STEERING SOLUTIONS IP HOLDING CORPORATION, Saginaw, MI (US)

*(72)* Inventors: Prerit Pramod, Saginaw, MI (US); Varsha Govindu, Saginaw, MI (US)

*(73)* Assignee: STEERING SOLUTIONS IP HOLDING CORPORATION, Saginaw, MI (US)

*(\*)* Notice: Subject to any disclaimer, the term of this patent is extended or adjusted under 35 U.S.C. 154(b) by 0 days.

*(21)* Appl. No.: 15/498,594

*(22)* Filed: Apr. 27, 2017

*(65)* Prior Publication Data

US 2018/0316291 A1    Nov. 1, 2018

*(51)* Int. Cl.
*H02P 7/06*          (2006.01)
*B62D 5/04*          (2006.01)

*(52)* U.S. Cl.
CPC .............. *H02P 7/06* (2013.01); *B62D 5/046* (2013.01)

*(58)* Field of Classification Search
CPC ............................................ H02P 7/06
USPC .................... 318/568.22, 632, 400.3, 400.24
See application file for complete search history.

*(56)* References Cited

U.S. PATENT DOCUMENTS

| | | | |
|---|---|---|---|
| 6,986,688 B1* | 1/2006 | Jansen | B63H 20/007 440/1 |
| 2003/0179004 A1* | 9/2003 | Fukusumi | G01R 31/006 324/713 |
| 2008/0112697 A1* | 5/2008 | Kim | G05B 19/416 388/823 |
| 2009/0000857 A1 | 1/2009 | Sugiyama et al. | |
| 2009/0254300 A1* | 10/2009 | Schneider | G01P 3/44 702/145 |
| 2011/0057593 A1* | 3/2011 | Williams | H02P 6/18 318/400.26 |
| 2013/0221885 A1* | 8/2013 | Hunter | H02P 21/0003 318/400.15 |
| 2014/0149000 A1 | 5/2014 | Tamura et al. | |
| 2014/0200767 A1 | 7/2014 | Mikamo et al. | |
| 2015/0198934 A1* | 7/2015 | Kaku | H02P 23/14 318/561 |
| 2015/0198935 A1* | 7/2015 | Kaku | H02P 23/12 318/561 |
| 2015/0239491 A1 | 8/2015 | Bolourchi et al. | |
| 2018/0148087 A1 | 5/2018 | Wang et al. | |

\* cited by examiner

*Primary Examiner* — Jorge L Carrasquillo
*(74) Attorney, Agent, or Firm* — Cantor Colburn LLP

*(57)* ABSTRACT

Technical solutions are described for a motor control system of a motor to compute a disturbance estimate and use the disturbance estimate to improve the performance of the motor control system. For example, the motor control system includes an observer module that receives an input voltage signal of the motor. The motor control system also receives an output current signal from the motor. The motor control system further computes the disturbance estimate of the motor control system based on a plant model of an electrical subsystem of the motor control system.

13 Claims, 8 Drawing Sheets

DISTURBANCE OBSERVER FOR PERMANENT MAGNET DIRECT CURRENT MACHINES

BACKGROUND OF THE INVENTION

The present application is generally related to direct current (DC) electrical machines, such as DC motors, and particularly to systems that use such machines, for example, electric power steering (EPS) systems.

In control systems, such as an EPS, a state observer is a system or module that provides an estimate of the internal state of the real control system, from measurements of the input and output of the real system. Knowing the internal system state facilitates addressing technical problems associated with the real system; for example, stabilizing the real system using state feedback. Typically, the physical internal system state of the EPS cannot be determined by direct measurement. Instead, indirect effects of the internal state are observed by way of the system outputs. The state observer module in such cases facilitates reconstructing at least a part of the internal system state based on the output measurements.

For example, an EPS system includes a motor that facilitates providing a driver assist during operation of the EPS system. Motor velocity is a critical signal for control of the EPS system. The motor velocity may be directly measured using sensors and/or tachometers. However, such direct measurement requires additional hardware, which leads to additional costs as well as engineering. Accordingly, it is desirable to use a state observer module to estimate the motor velocity signal in addition to other aspects of the working of the EPS system, without significant loss of accuracy.

SUMMARY OF THE INVENTION

According to one or more embodiments, a motor control system of a motor computes a disturbance estimate and uses the disturbance estimate to improve the performance of the motor. For example, the motor control system includes an observer module that receives an input voltage signal of the motor. The motor control system also receives an output current signal from the motor. The motor control system further computes the disturbance estimate of the motor control system based on a plant model of an electrical subsystem of the motor control system.

According to one or more embodiments, a method for determining a disturbance estimate for a motor control system is described. The method implemented by a control module of the motor control system. The method includes receiving an input voltage signal of a motor controlled by the motor control system. The method further includes receiving an output current signal from the motor. The method further includes computing the disturbance estimate of the motor control system based on a plant model of an electrical subsystem of the motor, the disturbance estimate including a first component based on a back-emf of the motor, and a second component based on a brush-drop voltage across the motor.

According to one or more embodiments, an electric power steering (EPS) system is described that includes a motor, and a motor control system including a controller module. The controller module receives an input voltage signal of the motor. The controller module also receives a measured output current signal of the motor. The controller module further computes a disturbance estimate of the motor control system based on a plant model of an electrical subsystem of the motor.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application-specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

In an EPS system equipped with a Permanent Magnet DC (PMDC) motor, no position sensors are used. Thus, typically, an observer module of such an EPS system estimates a motor velocity signal for a motor of the EPS system by using a predetermined plant model for the EPS.

For example, the control performance of the motor control system is improved by estimating the velocity signal and using the estimated velocity signal for several purposes such as power management, current regulator gain scheduling, and feedforward disturbance compensation, among others. Further, the EPS system can use the estimated velocity signal for other functions such as damping, inertia compensation, and hysteresis compensation among other functions that enhance the stability as well as steering feel of the EPS system.

Further yet, while the technical features of the technical solutions are described in the context of EPS systems, it should be noted that the technical solutions are applicable in other settings where DC electric machines with comparable control systems are used, such as for example industrial assembly lines, aircraft controllers, and various others.

A typical observer module estimates the motor velocity for a brushed motor using an open loop, which requires an accurate model (parameters) of the brush motor, which is difficult to obtain. Thus, the motor velocity estimate is highly sensitive to motor parameter estimation errors both from a dynamic and steady state standpoint, because the motor parameters vary nonlinearly with the operating condition and are difficult to estimate accurately. For example, in an EPS system with a PMDC motor, slight parameter estimation errors (modeling inaccuracies) result in incorrect velocity estimation near zero speed and at standstill (motor speed equal to zero). Further, depending upon the specific parameter estimate that is inaccurate, the resulting velocity estimate can have an undesirable phase lag or lead (from a dynamic standpoint). Further, the open loop nature of the observer module leads to low bandwidth signal estimate. In other words, open loop observers typically produce a signal estimate that, sometimes significantly, lags the actual signal, and have a lower magnitude as the signal frequency increases. Alternatively, a typical observer module, in the case of a brushless motor, estimates the motor velocity by differentiating a position signal that is received from a position sensor of the motor, which is typically a higher bandwidth estimate because it is produced from an actual measurement of position.

Hence, typically dynamic control systems perform poorly in terms of both control performance as well as noise when low-bandwidth signal estimates are employed. For example, typically PMDC based EPS systems use a static model of the PMDC machine to generate a velocity estimate signal. Such an estimated velocity signal has lower bandwidth and is thus insufficient for enhanced control performance. For example, when the estimated velocity signal is used for compensating a back-EMF (BEMF) of the motor of the EPS system, the closed loop system becomes unstable. Further, system level functions utilizing the estimated velocity signal as a control variable can also exhibit degraded performance due to the low bandwidth nature. Accordingly, the technical solutions described herein address such technical challenges by enhancing a current regulation performance through disturbance estimation and compensation of PMDC based systems directly.

For example, the technical solutions include technical features for a disturbance observer module for determining a disturbance estimate of PMDC based motor control system, such as a brush motor system. The disturbance estimate is based on a back-EMF (BEMF) and a brush drop of the PMDC system. The estimated velocity signal is extracted from the disturbance estimate using a feedforward model of the non-linear brush drop. Further, the determined disturbance estimate is employed for feedforward compensation of the disturbance itself. Further yet, a tuning technique is embedded in the observer module for making the estimator tuning easy and intuitive for an operator. The technical effects of the technical solutions described herein further include that the observer module has much higher bandwidth than the typical observer modules, without departing from the sensitivity afforded by the typical observer modules, thus improving observer modules, and in turn, motor control systems using the observer module described herein.

The embodiments described herein facilitate estimating the motor velocity of a motor of the EPS accurately using an observer module. Further, the embodiments described herein do not require additional sensors to be used for the estimation. The EPS system uses the estimated motor velocity for functions such as damping, inertia compensation, hysteresis compensation, and the like. Further yet, the EPS system uses the estimated motor velocity for active power management as well as current control of the motor.

Figure 1:
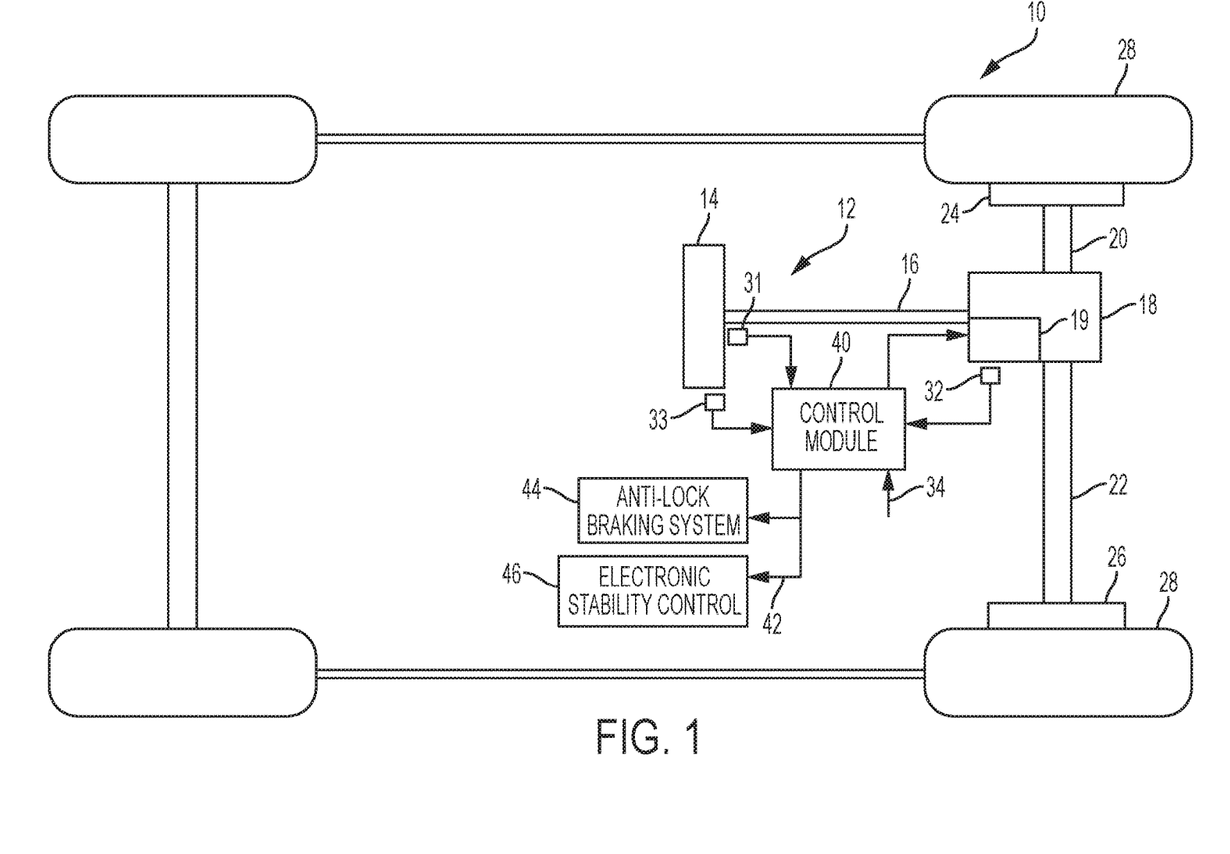
FIG. 1 illustrates an exemplary embodiment of a vehicle including a steering system, according to one or more embodiments.

Referring now to the Figures, where the invention will be described with reference to specific embodiments, without limiting same, FIG. 1 illustrates an exemplary embodiment of a vehicle 10 including a steering system 12. In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled to the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque applied to the handwheel 14 by the operator of the vehicle 10. The torque sensor generates a driver torque signal based thereon. In another example, the sensor 32 is a handwheel position sensor that senses a rotational angle as well as a rotational speed of the handwheel 14. The sensor 32 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning and perform friction classification to determine a surface friction level 42 as a control signal that can be used to control aspects of the steering system 12 through the steering assist unit 18. The surface friction level 42 can also be sent as an alert to an Anti-lock Braking System (ABS) 44 and/or Electronic Stability Control (ESC) system 46 indicating a change in surface friction, which may be further classified as an on-center slip (i.e., at lower handwheel angle) or an off-center slip (i.e., at higher handwheel angle) as further described herein. Communication with the ABS 44, ESC system 46, and other systems (not depicted), can be performed using, for example, a controller area network (CAN) bus or other vehicle network known in the art to exchange signals such as the vehicle speed signal 34.

Figure 2:
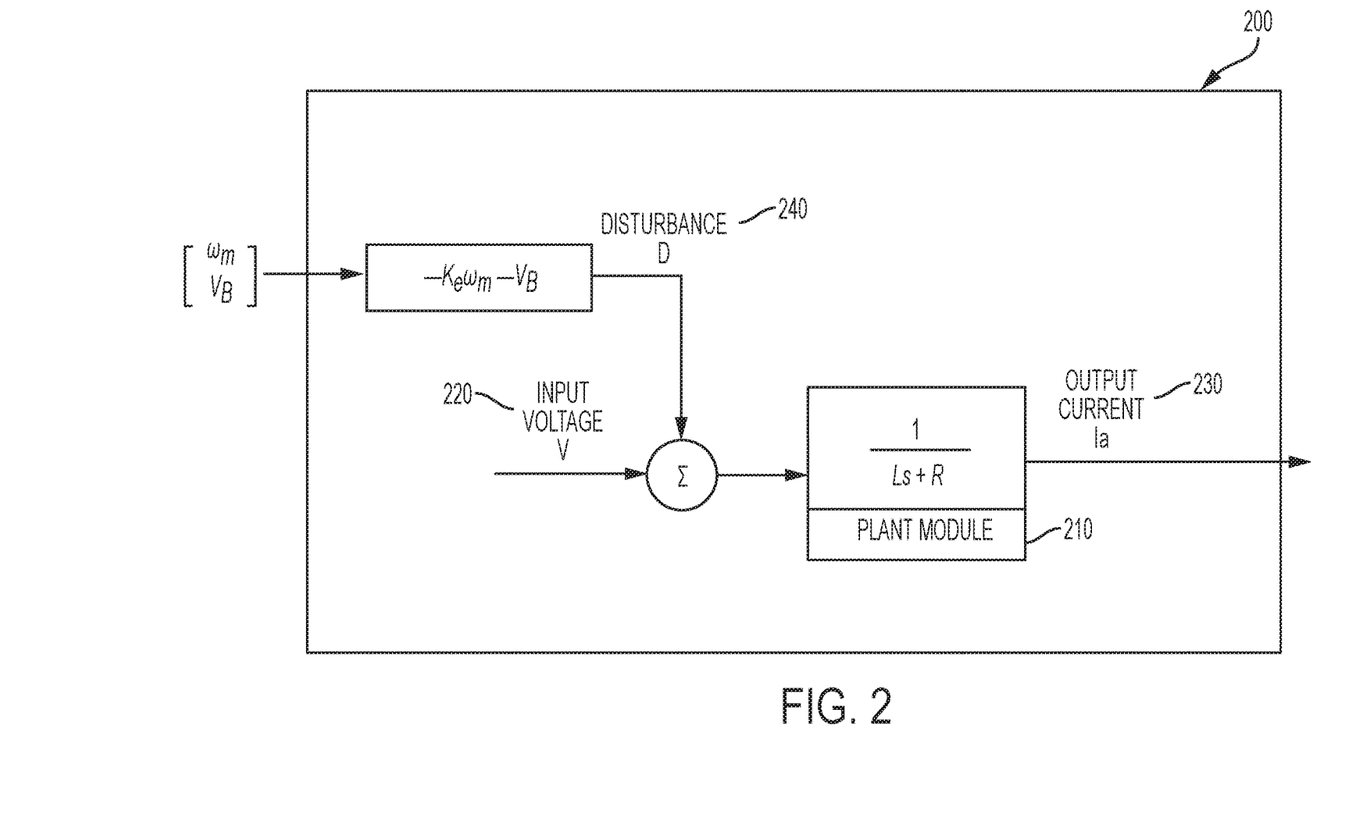
FIG. 2 illustrates a plant model of a permanent magnet DC (brush) motor, according to one or more embodiments.

FIG. 2 illustrates a plant model of a PMDC or brush motor 200 for the motor 19 of the steering system 12. The steering system 12 is an EPS system. A plant model of an electrical subsystem of the PMDC motor 200 is represented in part by a plant module 210. In one or more examples, the plant module 210 models the electrical subsystem of a PMDC motor 19. The plant module 210 receives a voltage signal 220 (V) as input and generates a current signal 230 ($I_a$) as output. In one or more examples, a disturbance 240 (D) affects the input voltage signal 220 as illustrated. The disturbance 240 can be a sum of BEMF and brush drop voltage $v_B$. In one or more examples, the PMDC motor 200 includes additional components, such as a delay compensation module, and so on.

Typically, an observer design is performed by utilizing a model of the plant whose state variable is to be extracted. In the case of the PMDC motor 19, the plant is the electrical sub-system of the PMDC motor, which can be modeled by equations $$V = K_e \omega_m + R i_a + L \frac{d i_a}{dt} + v_B; \text{ and}$$

$$T_e = K_e i_a,$$

where $K_e$, R, and L are the motor BEMF constant, resistance, and inductance respectively; V, $i_a$ and $T_e$ are the voltage input, current, and electromagnetic torque of the motor; and $\omega_m$ is the motor velocity. Further, brush voltage drop term $v_B$ is non-linear and can have the form, $$v_B = \sigma(i_a) V_0 \left(1 - e^{-\left|\frac{i_a}{I_0}\right|}\right),$$

where the term $\sigma(i_a)$ refers to the sign of current, and the quantities $V_0$ and $I_0$ are state variables of the function. The disturbance term is defined as the negative of the sum of the back-EMF and brush drop voltage terms as shown below, $$d = -(K_e \omega_m + v_B)$$

Further, the electrical parameters of the motor 19, namely the back-EMF constant or torque constant $K_e$, resistance R, and inductance L vary dynamically with the operating condition of the motor 19. The governing equation for parameter variations for a given magnet temperature $\theta_{Tm}$, can be expressed as, $$K_e = \gamma_{K_e}(K_{en}(1+\alpha_M(\theta_{Tm}-\theta_n))),$$

where $\gamma_{K_e}$ is a scaling factor accounting for magnetic saturation, and is a function of motor current $i_a$. Further, $\alpha_M$ is a constant representing a thermal coefficient of the permanent magnet material used in the motor 19.

Further, the inductance of the motor 19 can be described by the equation, $$L = \gamma_L L_n,$$

where $\gamma_L$ is a scaling factor for inductance based on the magnetic saturation characteristics of the motor 19, and is a function of the motor current $I_a$.

Further yet, the motor circuit resistance can be described by the equation, $$R = R_{FET}(1+\alpha_{Si}(\theta_{TSi}-\theta_n)) + R_m(1+\alpha_{Cu}(\theta_{TCu}-\theta_n)).$$

where $R_{FET}$ is the nominal value of FET resistance, $\alpha_{Si}$ is a constant representing the thermal coefficient of silicon, $\theta_{TSi}$ is the temperature of the FETs at the operating condition, $\theta_n$ is the nominal temperature at which $R_{FET}$ is measured, $R_m$ is the nominal value of motor resistance, $\alpha_{Cu}$ is a constant representing the thermal coefficient of the copper windings, $\theta_{TCu}$ is the temperature of the windings at the operating condition, $\theta_n$ is the nominal temperature at which $R_m$ is measured.

The equation above for the resistance provides the motor circuit resistance rather than the resistance of the motor windings only. In one or more examples, the aforementioned models of the parameter variations are employed to continuously estimate the motor parameters in real-time, or near real-time, which results in improved estimation of the signals used by the motor control system.

Further, the non-linear brush-drop term $v_B$ can be linearized for specific application to the motor control system using a piece-wise observer structure may be employed. Alternatively, as mentioned earlier, the brush-drop term $v_B$ along with BEMF can be cumulatively computed as the disturbance term d 240, which may be directly estimated using estimation techniques. It should be noted that the disturbance value d can be computed in presence of integral control for current regulation.

Accordingly, by computing the brush-drop term, the technical solutions herein further facilitate determining the observer behavior in terms of dynamic response, accuracy, and estimation of convergence speed.

The time domain model of the PMDC motor presented earlier may be transformed into the s-domain as, $$V(s) = (Ls+R) I_a(s) + D(s),$$

Another representation of the plant model of the electrical subsystem of the motor 19 using state-space representation is given by the following mathematical expressions in continuous time.

$$\dot{x} = Ax + Bu + Ed; \text{ and}$$

$$y = Cx$$

where x is a state vector including values of the current state of the EPS system 12, u is an input vector including measurable (and controllable) inputs to the EPS system 12, and D is the disturbance vector term 240 including measurable values that are not controllable, and typically non-linear in nature. Further, y is an output vector that is based on the current state x of the EPS system 12. A, B, C, and E, are configurable matrices which are setup to model the motor 19 of the EPS system 12. In one or more examples, the matrices may be preconfigured.

Figure 3:
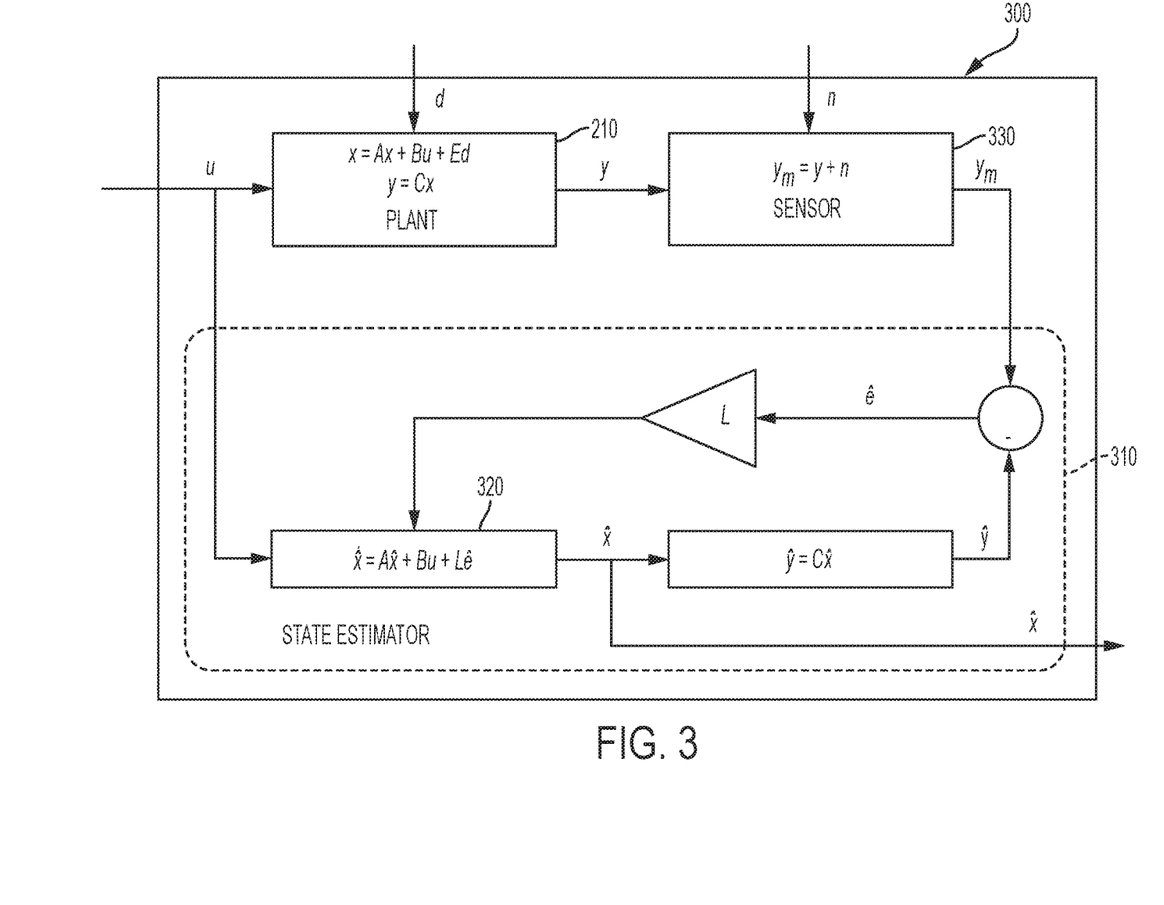
FIG. 3 depicts a structure and data flow of a state observer module, according to one or more embodiments.

FIG. 3 illustrates one or more components and a data flow of a state observer module, according to one or more embodiments. The observer module 300 includes a state estimator 310 that computes or estimates one or more state variables of the plant model. As shown in the figure, the state estimator 310 drives a model 320 of the plant of the motor 200 using the same control signal input applied to the PMDC plant module 210 and updates the state variables of the state estimator 310 until the state estimator outputs are driven to become equal to the measured system outputs. The state estimator module 310 receives the measured system outputs, or intermediate signals, via one or more sensors 330. The estimated state variables may then be used for any purpose within the PMDC motor control system. In one or more examples, the state estimator module 310 models the disturbance d 240 as a state variable.

In the depicted model, L is a matrix that includes observer gains, and is modified to achieve desired observer characteristics such as bandwidth. For example, for a linear observer, the gains are scalar values, and act upon a difference of the measured and estimated system outputs. It should be noted however, the present disclosure is not limited to such observers, and other observer structures such as non-linear estimators may also be employed. For instance, a sliding-mode observer may be employed where the state variables are updated on a scalar gain acting on the sign of the output error. Further, a reduced order implementation of the linear and non-linear observers may also be used for estimating the disturbance term and motor velocity.

Further, the disturbance estimate D 240 is considered to be a state of the system 12 with an unknown initial condition. With this assumption, the unknown step function has a derivative of zero, and accordingly, the modified plant model may be written as, $$\frac{d}{dt}\begin{bmatrix} i_a \\ d \end{bmatrix} = \begin{bmatrix} -\frac{R}{L} & \frac{1}{L} \\ 0 & 0 \end{bmatrix}\begin{bmatrix} i_a \\ d \end{bmatrix} + \begin{bmatrix} \frac{1}{L} \\ 0 \end{bmatrix} v$$

Further, a linear model for the state observer module 310 is given by, $$\begin{bmatrix} \dot{\hat{i}}_a \\ \dot{\hat{d}} \end{bmatrix} = \begin{bmatrix} -\frac{\hat{R}}{\hat{L}} & \frac{1}{\hat{L}} \\ 0 & 0 \end{bmatrix}\begin{bmatrix} \hat{i}_a \\ \hat{d} \end{bmatrix} + \begin{bmatrix} \frac{1}{\hat{L}} \\ 0 \end{bmatrix} v \begin{bmatrix} L_1 \\ L_2 \end{bmatrix}(i_a - \hat{i}_a)$$

Where $\hat{i}_a$ a is the estimated current, d is the estimated disturbance, R is the estimated motor circuit resistance, L is the estimated inductance, $L_1$ and $L_2$ are observer gains. Several different gain tuning strategies may be used for obtaining the observer gains, including Linear Quadratic Gaussian (LQG) estimator, pole placement etc. However, the technical solutions described herein implement the observer gain scheduling to facilitate an improved tuneability resulting in a single tunable parameter. Specifically, the gains are selected such that the observer poles are a scalar x times faster than the plant poles. For example, the observer error estimates are given by, $$\tilde{i}_a(t) = i_a(t) - \hat{i}_a(t); \text{ and}$$

$$\tilde{d}(t) = d(t) - \hat{d}(t).$$

For example, in the case the estimated parameters are same as actual parameters, the error dynamics between the plant and observer are obtained as, $$\begin{bmatrix} \dot{\tilde{i}}_a \\ \dot{\tilde{d}} \end{bmatrix} = \begin{bmatrix} -\frac{\hat{R}}{\hat{L}} - L_1 & \frac{1}{\hat{L}} \\ -L_2 & 0 \end{bmatrix}\begin{bmatrix} \tilde{i}_a \\ \tilde{d} \end{bmatrix}.$$

Comparing the characteristic equation of error dynamics matrix and a characteristic equation with roots that are x times faster than the plant pole $$-\frac{R}{L},$$

observer gains $L_1$ and $L_2$ are given by:

$$L_1 = \frac{\hat{R}}{\hat{L}}(2x-1); \text{ and}$$

$$L_2 = \frac{x^2 \hat{R}^2}{\hat{L}}.$$

Thus, the observer equations are given by, $$\begin{bmatrix} \dot{\hat{i}}_a \\ \dot{\hat{d}} \end{bmatrix} = \begin{bmatrix} -\frac{\hat{R}}{\hat{L}} & \frac{1}{\hat{L}} \\ 0 & 0 \end{bmatrix}\begin{bmatrix} \hat{i}_a \\ \hat{d} \end{bmatrix} + \begin{bmatrix} \frac{1}{\hat{L}} \\ 0 \end{bmatrix} v + \begin{bmatrix} \frac{\hat{R}}{\hat{L}}(2x-1) \\ \frac{x^2 \hat{R}^2}{\hat{L}} \end{bmatrix}(i_a - \hat{i}_a).$$

The observer stability and achievable bandwidth may be limited by the sample time of the control loop in which it is implemented. Accordingly, the calculation of the worst-case scalar k that may make the observer unstable is performed offline and used for limiting the tunable value of k so as to prevent instability. Further, it should be noted that the scalar k may further be scheduled as a function of multiple signals in the system, such as measured current, velocity estimate, vehicle speed and so on.

Figure 4:
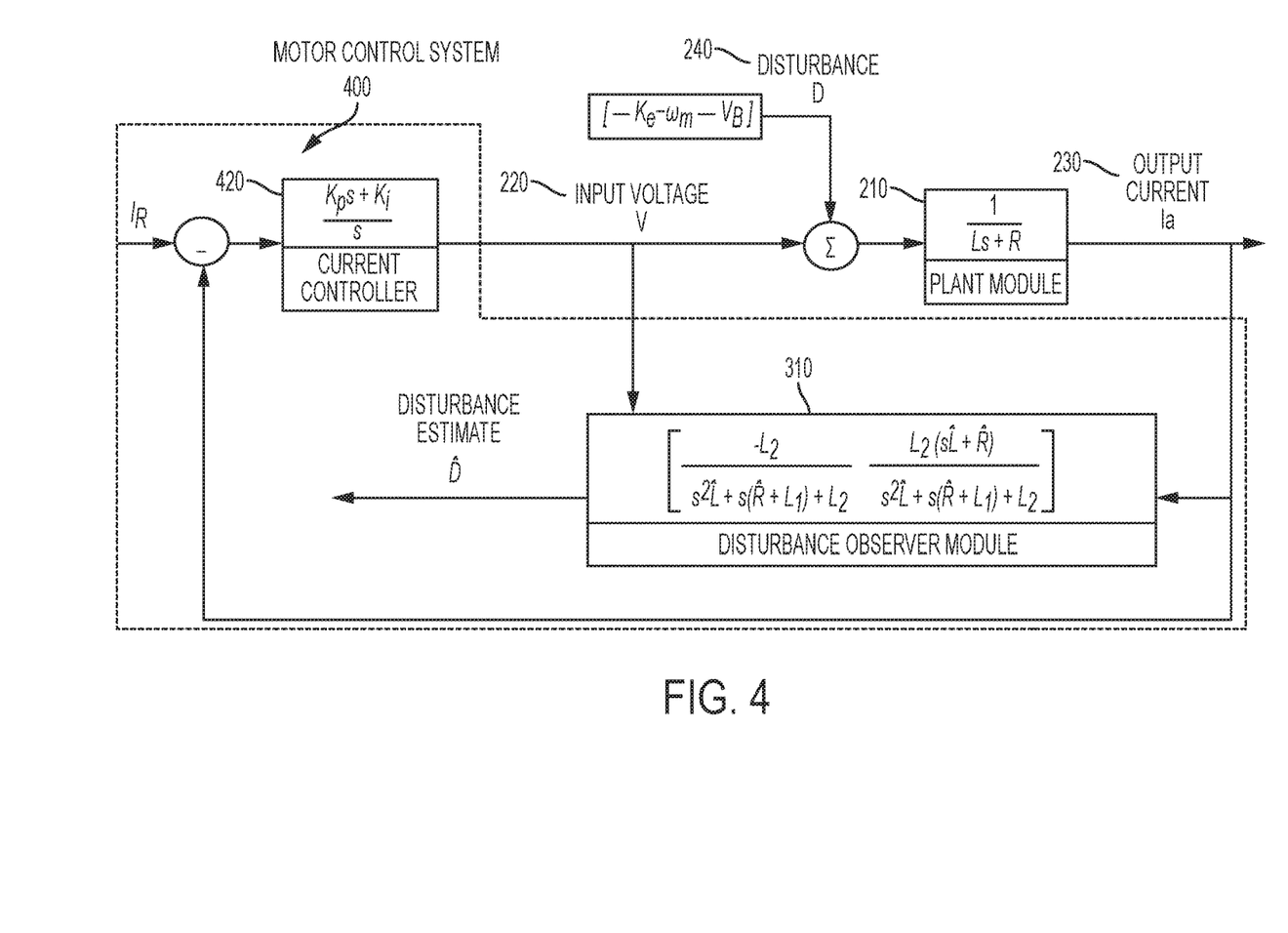
FIG. 4 depicts an example structure and a data flow for a motor control system with a state observer module, according to one or more embodiments.

FIG. 4 illustrates a block diagram of an example motor control system 400 with the improvements facilitated by the technical features described herein. The motor control system 400 as illustrated includes, among other components, a disturbance observer module 310, and a current controller 420, in addition to the plant module 210. In one or more examples, the disturbance observer module 310 refers to the state estimator 310 from FIG. 3. In one or more examples, the components, such as the disturbance observer module 310 include hardware components, such as an ASIC, an FPGA, or the like. Alternatively, or in addition, the modules include computer executable instructions embedded on a memory that are executable by a processing unit, such as the control module 40.

In one or more examples, the current controller 420 is a PI controller that controls the input voltage signal V 220 being applied to the motor 19 to generate the current $I_A$ 230, and in turn the motor 19 to operate at a desired velocity. The current controller 420 receives the current signal $I_R$ as input, and also receives the output current $I_A$ 230 as feedback to calculate an error term to control the input voltage signal V 220. As described herein, the disturbance D 240 affects the input voltage signal 220 after the current controller 420 has adjusted the input current reference or command $I_R$ based on the feedback.

Therefore, to determine the disturbance D 240, the disturbance observer module 310 receives the input voltage signal V 220 and the output current $I_A$ 230. The transfer matrix for the motor control system 200, as shown in the figure, is given by, $$[\hat{d}] = [L_{DV}(s) \quad L_{IV}(s)]\begin{bmatrix} V \\ I_M \end{bmatrix}$$

$$= \begin{bmatrix} \frac{-L_2}{s^2\hat{L} + s(\hat{R}+L_1) + L_2} & \frac{L_2(s\hat{L}+\hat{R})}{s^2\hat{L} + s(\hat{R}+L_1) + L_2} \end{bmatrix}\begin{bmatrix} V \\ I_M \end{bmatrix}.$$

Accordingly, based on the above equation the disturbance observer module 310 determines the disturbance value D 240 by based on the values input for the gain matrices $L_1$ and $L_2$. As described earlier, the gain matrices are made tunable to a single parameter by using a linear observer. Thus, the tune-ability of the motor control system to determine the disturbance value D 240 is improved through the gain scheduling of linear observer, resulting in a single scalar tunable parameter x described herein. The disturbance observer module 310 facilitates providing an improved dynamic performance, but similar steady-state sensitivity to modeling errors compared to motor control systems that use state observer modules without estimating the disturbance value 240.

Figure 5:
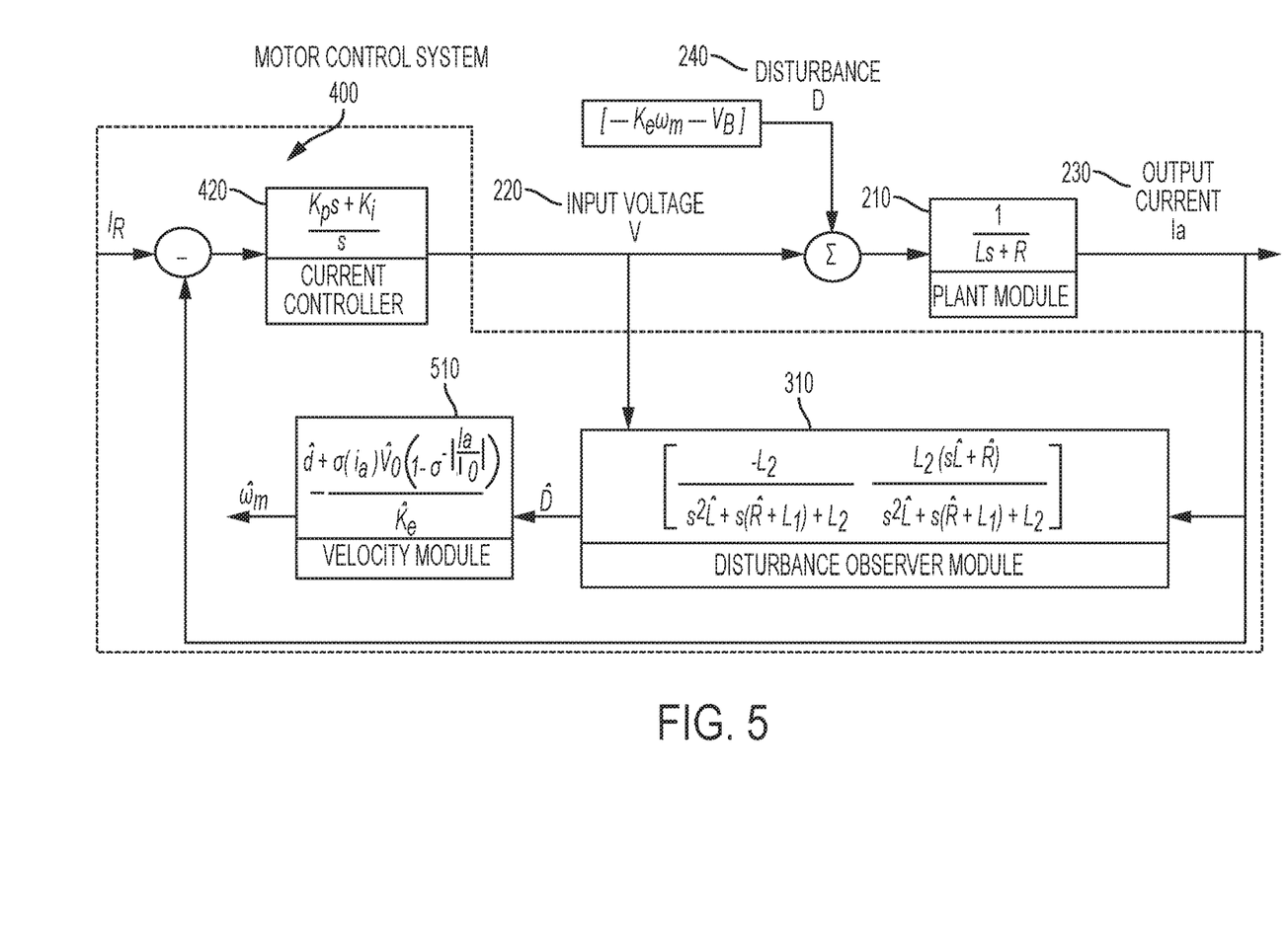
FIG. 5 illustrates an example structure and a data flow for a motor control system with a disturbance state observer module and a velocity estimation module, according to one or more embodiments.

FIG. 5 illustrates an example motor control system 400 that uses the computed disturbance value D 240 to estimate the motor velocity signal, according to one or more embodiments. In addition to components described elsewhere, the motor 200 includes a velocity module 510. The velocity module 510 receives the computed (or observed) output of the disturbance observer module 410, and extracts and outputs the motor velocity $\hat{\omega}_m$. As described earlier, the disturbance estimate D 240 is estimated based on $$\hat{d} = -\hat{K}_e \hat{\omega}_m - \hat{v}_B.$$

Accordingly, the motor velocity $\hat{\omega}_m$ is extracted by the velocity module 510 by using a model based (feedforward type) estimate of the brush-drop along with an estimate of $K_e$ as follows, $$\hat{\omega}_m = -\frac{\hat{d} + \sigma(i_a)\hat{V}_0\left(1 - e^{-\left|\frac{i_a}{I_0}\right|}\right)}{\hat{K}_e},$$

where $V_o$ and $I_o$ are estimated state variables of the function. It should be noted that, as used throughout the present document, the "hats" imply the estimated version of the true parameters.

The disturbance observer module 310 above produces a higher bandwidth motor velocity signal estimate as compared to simpler motor velocity estimates computed using static models of the plant. Accordingly, the estimated motor velocity by the motor control system has a faster setting time compared to other techniques. Further yet, the motor velocity determination described herein does exhibits lesser, or no overshoot that is typically observed with the other techniques. Further yet, with the higher bandwidth, the motor velocity determination has a faster response time as the observer gain is changed. Additionally, inductance errors have lesser effect on the motor velocity determined using the technical solutions herein, and the motor velocity determined has improved dynamic performance during a step change in velocity and current, compared to velocity estimation without the disturbance estimate 240. Thus, the motor control system 400 has an improved control performance because of the motor velocity being determined based on the disturbance estimate 240 as described herein.

Figure 6:
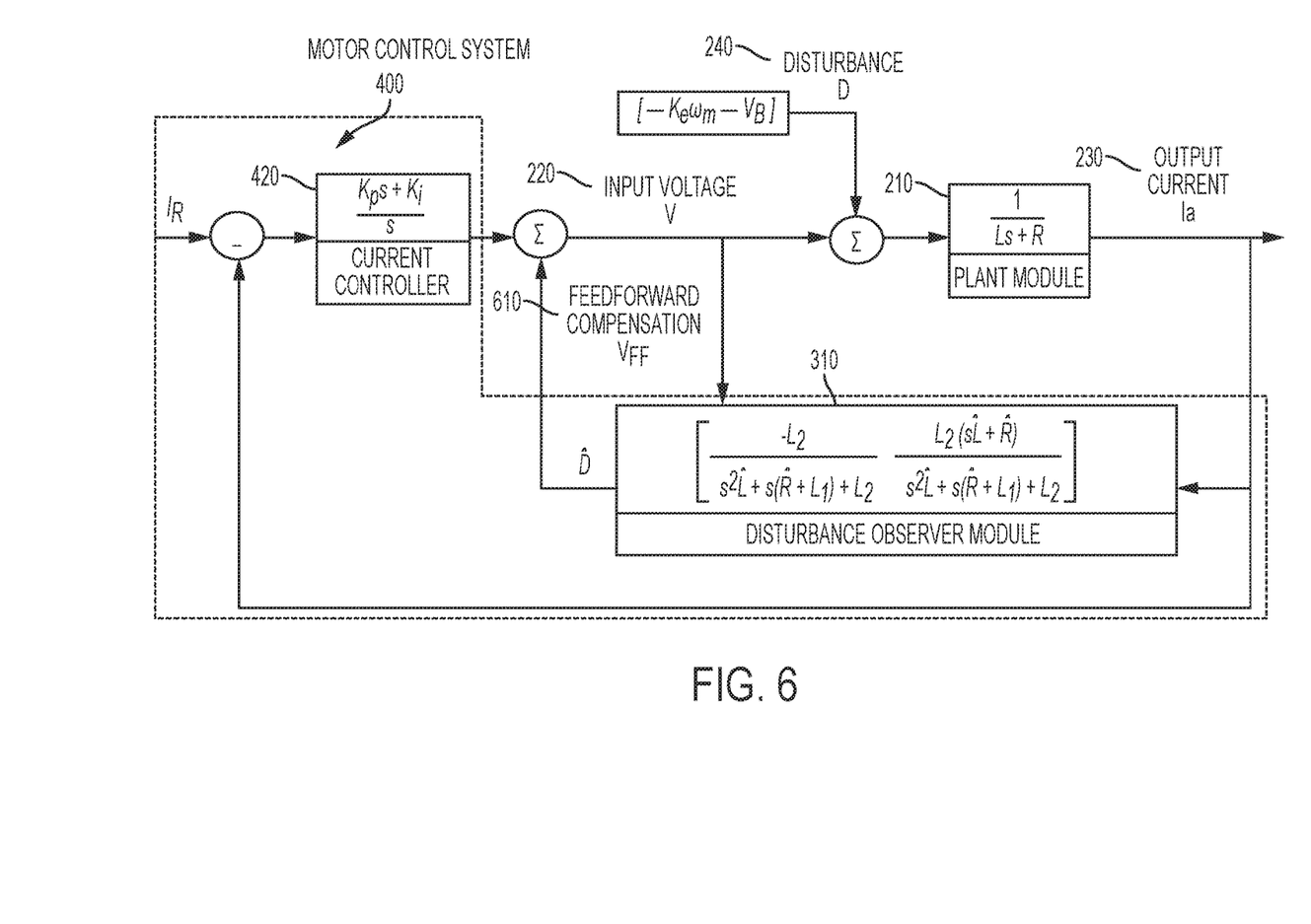
FIG. 6 illustrates an example structure and a data flow for a motor control system with a disturbance state observer module with disturbance compensation, according to one or more embodiments.

FIG. 6 illustrates an example motor control system 400 that uses the computed disturbance value D 240 as feedforward compensation for improving dynamic current response of the motor control system 400, according to one or more embodiments. In one or more examples, the determined disturbance estimate D 240 is used for direct feedforward signal injection as illustrated. For example, the disturbance estimate D 240 is added to the input voltage signal V as a feedforward voltage signal $V_{FF}$ using an adder 610. The additional $V_{FF}$ provided as feedforward compensation improves the dynamic current response, improving the setting time for motor velocity in comparison to not using the feedforward compensation. Further, the feedforward compensation improves (reduces) the transient time required for the output current $I_A$ to reach a stable state in comparison to a motor control system without feedforward compensation using the disturbance estimate D 240. Thus, the feedforward compensation facilitates the motor control system 400 to provide flexibility in control performance. Accordingly, the motor control system 400 with feedforward compensation using the disturbance observer module 410 improves closed loop current control performance.

A motor control system 400 that implements the technical features for motor velocity estimation described herein performs motor velocity estimation in an improved manner with respect to dynamics in comparison to other motor control systems that may use static plant based observer estimation techniques. For example, for a step change in motor velocity the motor control system 400 described herein, uses the disturbance estimate 240 to determine the estimated motor velocity signal, and reaches a steady state faster and does not have any overshoot.

Further, using the disturbance estimate 240 for feedforward compensation, with a step change in velocity, both motor velocity tracking and current tracking response are improved with faster steady state response and less overshoot when compared to motor control configuration without feedforward compensation. Thus, the feedforward disturbance compensation further improves the overall current control performance of the motor control system 400, and also improves the velocity estimation of the motor control system 400.

Additionally, the single scalar tuning parameter improves the responsiveness of the motor velocity estimation. With a step change in velocity, the estimated motor velocity signal reaches steady state faster as the observer gain increases. However, the current tracking is unaffected in response to a step change in speed without feedforward compensation.

Further, test results for the motor control system implementing the one or more technical features described herein indicate that for a step change in motor velocity, the feedforward compensation facilitates improvements in motor velocity estimation with errors in resistance, facilitates improvements in dynamics with errors in inductance and has little to no effect with errors in BEMF constant. At the same time, the current control response is also improved with feedforward compensation irrespective of parameter errors. Additionally, the test results indicate that with a step change in current command, none of the parameter errors have a significant effect on either the velocity response or the current tracking performance of the motor control system 400. Further yet, for a step change in velocity, the current control performance is improved when feedforward compensation is active for all parameter errors, while the velocity estimation is improved dynamically under inductance errors and unaffected otherwise.

Figure 7:
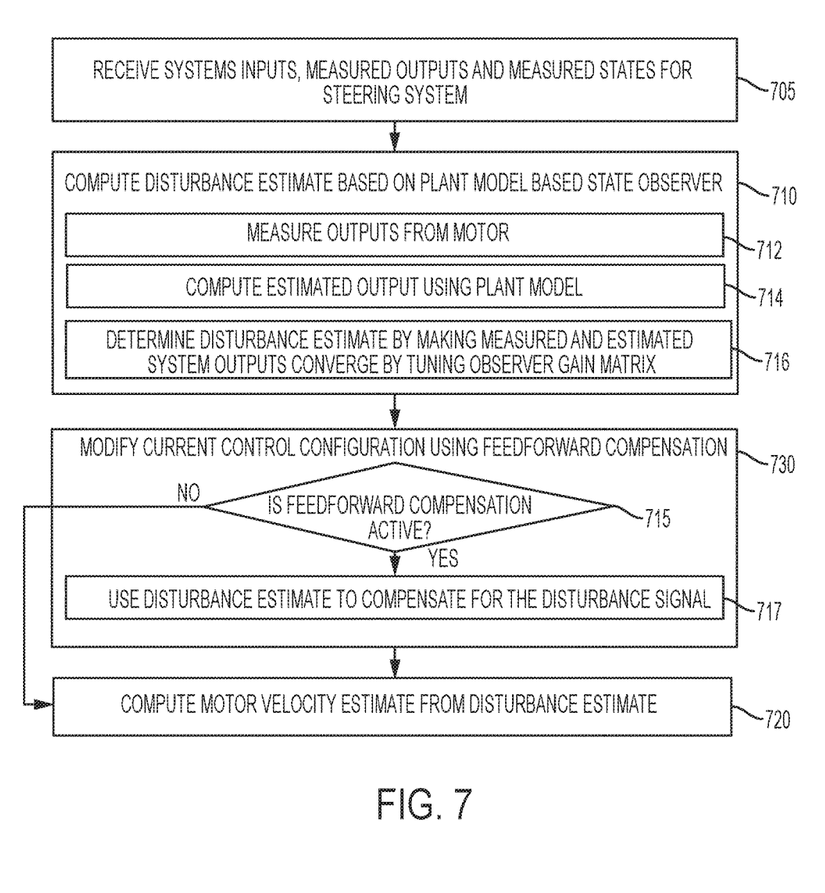
FIG. 7 illustrates a flowchart of an example method for computing a disturbance estimate of a motor control system and using it to improve the motor control system, according to one or more embodiments.

FIG. 7 illustrates a flowchart of an example method for determining the disturbance estimate D 240 and further using the disturbance estimate 240 for estimating the motor velocity and using the disturbance estimate 240 for feedforward compensation in the motor control system 400, according to one or more embodiments.

In one or more examples, the disturbance observer module 310 receives as inputs the input voltage V 220 and the measured output current from the motor control system $I_A$ 230 in conjunction with other state measurements of the system, as shown at 705. The disturbance observer module 310 computes the estimated disturbance estimate D 240, as shown at 710. In one or more examples, the disturbance observer module 310 estimates the disturbance estimate using a plant model, as shown at 710.

Estimating the disturbance estimate D 240 includes measuring output parameters of the motor 19, as shown at 712, and comparing those with estimates from the plant module 210 that uses the plant model, as shown at 714. The plant module 210 measures a difference ê between the measured outputs and the estimated outputs, and uses the gain matrix L such that the difference ê between the two outputs. Accordingly, the disturbance observer module 310 makes the two outputs converge, as shown at 716. In the converged state, the disturbance observer module 310 outputs the estimated disturbance estimate D 240.

The method further includes computing the estimated motor velocity from the disturbance estimate D 240, as shown at 720. The motor velocity is computed based on the brush voltage drop term $v_B$ and the back-EMF constant $K_e$, as described herein.

The method further includes modifying current control configuration using feedforward compensation, as shown at 730. In one or more examples, the modification may be performed prior to computing the motor velocity estimate. For example, modifying the current control configuration may include blending the disturbance estimate D 240 with the input voltage signal V as feedforward compensation. For example, if the feedforward compensation is active, which may be indicated by a signal value, a bit, or any other feedforward state indicator, the disturbance estimate 240 is used to compensate for the disturbance signal, as shown at 715 and 717. In one or more examples, the disturbance estimate D 240 is added to the input voltage signal V 220.

The computed motor velocity estimate is output by the velocity estimate module 510 for other components of the steering system 12 to use. For example, the estimated motor velocity is output to one or more components of the EPS system 12 and/or the vehicle 10 for providing functions such as damping, inertia compensation, and hysteresis compensation among others.

Figure 8:
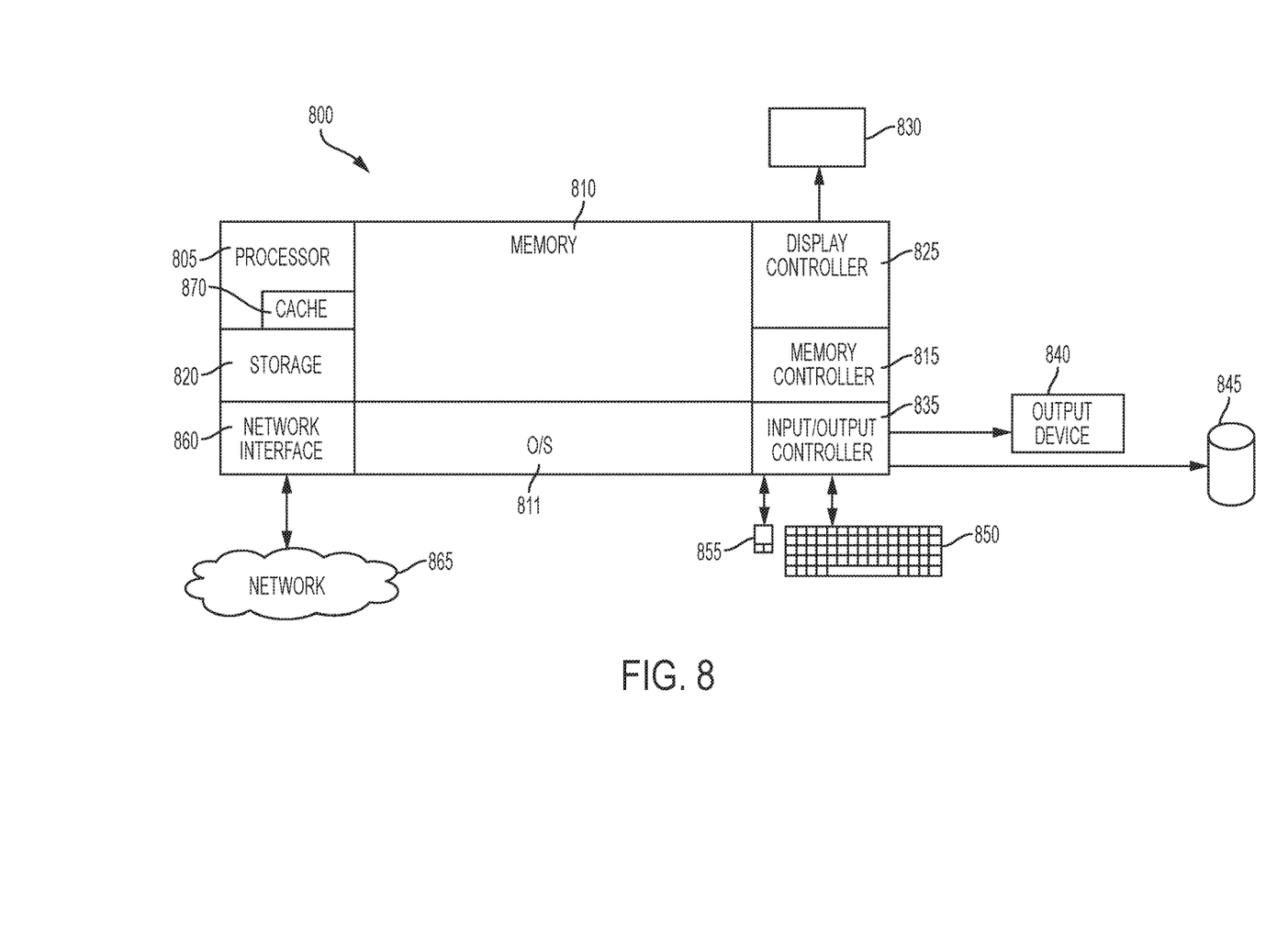
FIG. 8 illustrates an example processing unit, according to one or more embodiments.

FIG. 8 illustrates an example of a processing unit 800. The processing unit may be used as one of the components described herein, such as the control module 40 of the EPS system 12, the motor 200, among others. The processing unit 800 includes hardware, such as electronic circuitry, for example a microprocessor.

The processing unit 800 includes, among other components, a processor 805; memory 810 coupled to a memory controller 815, and one or more input devices 845 and/or output devices 840, such as peripheral or control devices that are communicatively coupled via a local input-output (I/O) controller 835. These devices 840 and 845 may include, for example, battery sensors, position sensors, indicator/identification lights and the like. Input devices such as a conventional keyboard 850 and mouse 855 may be coupled to the I/O controller 835. The I/O controller 835 may be, for example, one or more buses or other wired or wireless connections, as are known in the art. The I/O controller 835 may have additional elements, which are omitted for simplicity, such as controllers, buffers (caches), drivers, repeaters, and receivers, to enable communications.

The I/O devices 840, 845 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 805 is a hardware device for executing hardware instructions or software, particularly those stored in memory 810. The processor 805 may be a custom made or commercially available processor, a central processing unit (CPU), an auxiliary processor among several processors associated with the control module 40, a semiconductor based microprocessor (in the form of a microchip or chip set), a macroprocessor, or other device for executing instructions. The processor 805 includes a cache 870, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 870 may be organized as a hierarchy of more cache levels (L1, L2, and so on.).

The memory 810 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 810 may incorporate electronic, magnetic, optical, or other types of storage media.

The instructions in memory 810 may include one or more separate programs, each of which comprises an ordered listing of executable instructions for implementing logical functions. In the example of FIG. 8, the instructions in the memory 810 include a suitable operating system (OS) 811. The operating system 811 essentially may control the execution of other computer programs and provides scheduling, input-output control, file and data management, memory management, and communication control and related services.

Additional data, including, for example, instructions for the processor 805 or other retrievable information, may be stored in storage 820, which may be a storage device such as a hard disk drive or solid state drive. The stored instructions in memory 810 or in storage 820 may include those enabling the processor to execute one or more aspects of the systems and methods described herein.

The processing unit 800 may further include a display controller 825 coupled to a user interface or display 830. In some embodiments, the display 830 may be an LCD screen. In other embodiments, the display 830 may include a plurality of LED status lights. In some embodiments, the processing unit 800 may further include a network interface 860 for coupling to a network 865. The network 865 may be a CAN-based network, or an IP-based network for communication between the processing unit 800 and other components of the vehicle 10. The network 865 transmits and receives data between the processing unit 800 and external components. In one or more examples, the processing unit 800 implements the technical solutions described herein.

The technical solutions described herein facilitate an EPS system to estimate a motor velocity of a motor using a state observer module using a plant model of the electrical subsystem of a motor control system. In one or more examples, the motor may be part of an EPS system. The technical solutions facilitate the velocity estimation for brushed DC motors by modeling disturbance as a state of the electrical subsystem. Further, the technical solutions implement feedforward disturbance compensation by using the estimated disturbance estimate. Such feedforward compensation results in improved current control performance. Further yet, the technical solutions facilitate an improved tune-ability of the disturbance observer module 310 through observer gain scheduling using a single scalar value. Using the single tuning parameter helps in simplifying calibration process. Further yet, protection features for potential observer instabilities are included in the operation of the technical solutions.

The technical solutions thus address technical challenges with typical observers used for estimating motor velocity. For example, typical Brushed DC motors use a static motor model based open-loop type observer, which provides low bandwidth estimation due to open-loop nature of observer. Further, in certain current control loop configurations such as feedforward disturbance compensation, the existing state observers may display instability. Further yet, the existing open-loop observers are sensitive to motor parameter estimation errors both from a dynamic and steady state standpoint. Because motor parameters vary highly nonlinearly with operating condition, their accurate estimation is difficult.

The technical solutions address such challenges and facilitate an improved motor control state observer based on determining a disturbance estimate. For example, the technical solutions described herein facilitate estimating higher bandwidth motor velocity signal, perform feedforward disturbance compensation effectively, and facilitate improved dynamic response. Thus, the technical solutions, in comparison to typical motor velocity estimation techniques, provide better amplitude and phase response characteristics. The technical solutions facilitate improved control and diagnostics of PMDC drive systems, both at a motor control level as well as system level steering control.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A motor control system of a motor, the motor control system comprising:
an observer module configured to:
receive an input voltage signal of the motor;
receive an output current signal from the motor; and
compute a disturbance estimate of the motor control system as a measured state of a plant model of an electrical subsystem of the motor control system, the disturbance estimate expressed as $\hat{d} = -\hat{K}_e \hat{\omega}_m - \hat{v}_B$, where $\hat{d}$ is the disturbance estimate, $\hat{K}_e$ is a back-emf constant, $\hat{\omega}_m$ is a motor velocity, and $\hat{v}_B$ is brush-drop voltage; and
computing the motor velocity of the motor based on the disturbance estimate as $$\hat{\omega}_m = -\frac{\hat{d} + \sigma(i_a)\hat{V}_0\left(1 - e^{-\left|\frac{i_a}{i_0}\right|}\right)}{\hat{K}_e},$$

where $V_0$ and $I_0$ are estimated state variables and $i_a$ is a motor current.

2. The motor control system of claim 1, further comprising a velocity module configured to determine an estimated motor velocity of the motor based on the disturbance estimate.

3. The motor control system of claim 1, wherein the observer module is further configured to add the disturbance estimate with the input voltage signal to compensate for actual disturbance term to facilitate feedforward compensation.

4. The motor control system of claim 1, wherein the observer module computes the disturbance estimate by tuning a gain matrix using a single scalar value.

5. The motor control system of claim 1, wherein the motor is a brushed motor.

6. A method for determining a disturbance estimate for a motor control system, the method implemented by a control module of the motor control system, the method comprising:
receiving an input voltage signal of a motor controlled by the motor control system;
receiving an output current signal from the motor; and
computing the disturbance estimate of the motor control system as a measured state of a plant model of an electrical subsystem of the motor, the disturbance estimate including a first component based on a back-emf of the motor, and a second component based on a brush-drop voltage across the motor, the disturbance estimate expressed as $\hat{d}=-\hat{K}_e\hat{\omega}_m-\hat{v}_B$, where $\hat{d}$ is the disturbance estimate, $\hat{K}_e$ is a back-emf constant, $\hat{\omega}_m$ is a motor velocity, and $\hat{v}_B$ is the brush-drop voltage; and
computing the motor velocity estimate of the motor based on the disturbance estimate by extracting the motor velocity estimate from the disturbance estimate based on the back-emf constant.

7. The method of claim 6, further comprising blending the disturbance estimate with the input voltage signal to provide feedforward compensation.

8. The method of claim 7, wherein adding the disturbance estimate to the input voltage signal comprises compensating the actual disturbance signal.

9. The method of claim 6 wherein computing the disturbance estimate comprises tuning a gain matrix of an observer module using a single scalar value to converge an estimated output current from a disturbance observer module with the output current signal from the motor.

10. The method of claim 6, wherein the motor is a permanent magnet brushed motor.

11. An electric power steering (EPS) system comprising:
a motor; and
a motor control system comprising a controller module configured to:
receive an input voltage signal of the motor;
receive a measured output current signal of the motor; and
compute a disturbance estimate of the motor control system, which is modeled as a state variable of a plant model of an electrical subsystem of the motor, the disturbance estimate expressed as $\hat{d}=-\hat{K}_e\hat{\omega}_m-\hat{v}_B$, where $\hat{d}$ is the disturbance estimate, $\hat{K}_e$ is a back-emf constant, $\hat{\omega}_m$ is a motor velocity, and $\hat{v}_B$ is a brush-drop voltage; and
determine an estimated motor velocity of the motor based on the disturbance estimate by extracting the estimated motor velocity using the back-emf constant of the motor.

12. The electric power steering system of claim 11, wherein the control module is further configured to blend the disturbance estimate with the input voltage signal to provide feedforward compensation to the motor control system.

13. The electric power steering system of claim 12, wherein blending the disturbance estimate with the input voltage signal comprises increasing the input voltage signal by the value of the disturbance estimate to compensate for a disturbance signal.

* * * * *